US012263471B2

United States Patent
Harbuzaru et al.

(10) Patent No.: US 12,263,471 B2
(45) Date of Patent: Apr. 1, 2025

(54) RAPID SYNTHESIS OF A CATALYST COMPRISING A ZEOLITE HAVING AN AFX STRUCTURE AND AT LEAST ONE TRANSITION METAL FOR SELECTIVE NOX REDUCTION

(71) Applicant: IFP Energies nouvelles, Rueil-Malmaison (FR)

(72) Inventors: Bogdan Harbuzaru, Rueil-Malmaison (FR); David Berthout, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 524 days.

(21) Appl. No.: 17/604,273

(22) PCT Filed: Apr. 14, 2020

(86) PCT No.: PCT/EP2020/060474
§ 371 (c)(1),
(2) Date: Oct. 15, 2021

(87) PCT Pub. No.: WO2020/212354
PCT Pub. Date: Oct. 22, 2020

(65) Prior Publication Data
US 2022/0193645 A1  Jun. 23, 2022

(30) Foreign Application Priority Data

Apr. 19, 2019 (FR) ..................................... 1904198

(51) Int. Cl.
| | | |
|---|---|---|
| B01J 35/36 | (2024.01) | |
| B01J 29/76 | (2006.01) | |
| B01J 35/56 | (2024.01) | |
| B01J 37/00 | (2006.01) | |
| B01J 37/02 | (2006.01) | |
| B01J 37/04 | (2006.01) | |
| B01J 37/08 | (2006.01) | |
| F01N 3/20 | (2006.01) | |

(52) U.S. Cl.
CPC .............. B01J 29/76 (2013.01); B01J 35/56 (2024.01); B01J 37/0009 (2013.01); B01J 37/0215 (2013.01); B01J 37/04 (2013.01); B01J 37/08 (2013.01); F01N 3/2066 (2013.01); F01N 2570/14 (2013.01)

(58) Field of Classification Search
None
See application file for complete search history.

(56) References Cited

U.S. PATENT DOCUMENTS

| | | | |
|---|---|---|---|
| 4,508,837 A | 4/1985 | Zones | |
| 5,194,235 A | 3/1993 | Zones | |
| 10,053,368 B1 * | 8/2018 | Xie | ......... C01B 39/48 |
| 2016/0096169 A1 | 4/2016 | Rivas-Cardona | |
| 2016/0137518 A1 | 5/2016 | Rivas-Cardona | |
| 2017/0348678 A1 * | 12/2017 | Davis | ....... B01J 29/70 |
| 2018/0093259 A1 | 4/2018 | Chen | |
| 2018/0093897 A1 | 4/2018 | Chen | |

FOREIGN PATENT DOCUMENTS

| | | | | |
|---|---|---|---|---|
| CN | 107532497 | * | 1/2018 | |
| EP | 3378831 A1 | | 9/2018 | |
| JP | 2014-148441 A | | 8/2014 | |
| JP | 2016-169139 A | | 9/2016 | |
| WO | 2016/077667 A1 | | 5/2016 | |
| WO | 2017/080722 A1 | | 5/2017 | |
| WO | 2017/087385 A1 | | 5/2017 | |
| WO | WO-2017153894 A1 * | 9/2017 | ............. B01D 53/94 |
| WO | 2017/200607 A1 | | 11/2017 | |
| WO | WO-2017202495 A1 * | 11/2017 | ............. B01J 20/02 |
| WO | 2019/224081 A1 | | 11/2019 | |
| WO | 2019/224082 A1 | | 11/2019 | |
| WO | 2019/224083 A1 | | 11/2019 | |

(Continued)

OTHER PUBLICATIONS

Dustin W. Fickel et al."Copper Coordination in Cu-SSZ-13 and Cu-SSZ-16 Investigated by Variable-Temperature XRD" The Journal of Physical Chemistry C 114 (3), 2010, pp. 1633-1640 (cited in specification).

(Continued)

*Primary Examiner* — Sheng H Davis
(74) *Attorney, Agent, or Firm* — FITCH, EVEN, TABIN & FLANNERY, LLP

(57) ABSTRACT

The invention relates to a process for preparing a catalyst based on a zeolite of AFX structural type and on at least one transition metal, comprising at least the following steps: i) mixing, in an aqueous medium, of at least one source of silicon in oxide form $SiO_2$, of at least one source of aluminium in oxide form $Al_2O_3$, of an organic nitrogen-comprising compound R, of at least one source of at least one alkali metal and/or alkaline-earth metal M until a homogeneous precursor gel is obtained; ii) hydrothermal treatment of said precursor gel to obtain a crystallized solid phase, iii) at least one ion exchange with a transition metal; iv) heat treatment.
The invention also relates to the catalyst capable of being obtained or directly obtained by the process and to the process for the selective reduction of NOx employing the catalyst.

16 Claims, 5 Drawing Sheets

(56) References Cited

FOREIGN PATENT DOCUMENTS

Figure 1:
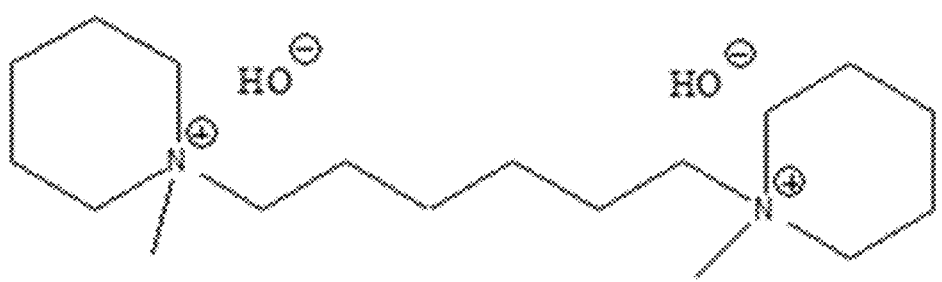
Figure 2A:
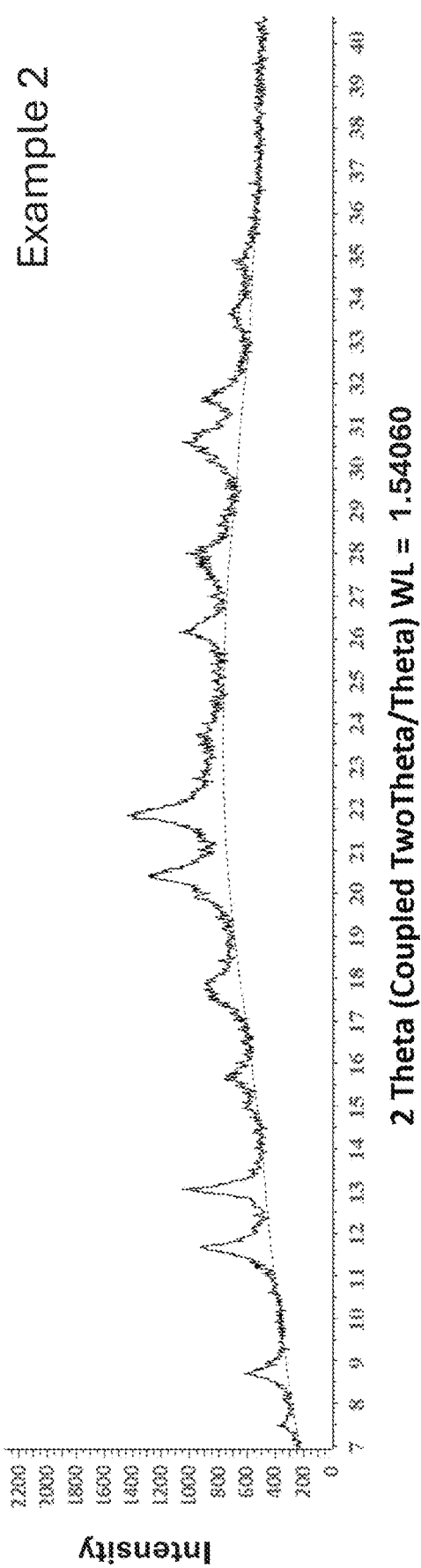
Figure 2B:
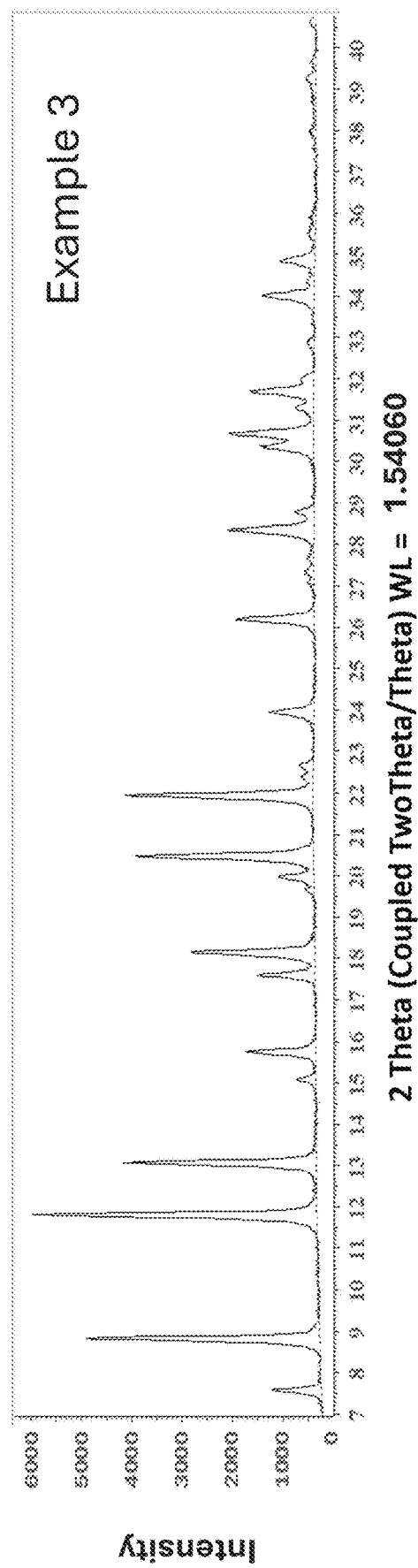
Figure 2C:
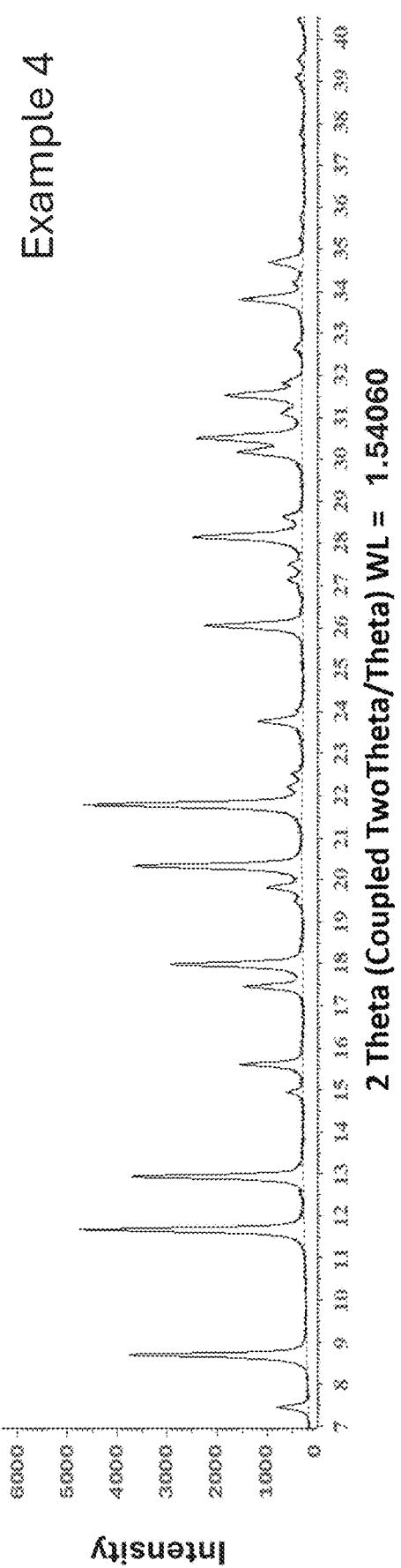
Figure 2D:
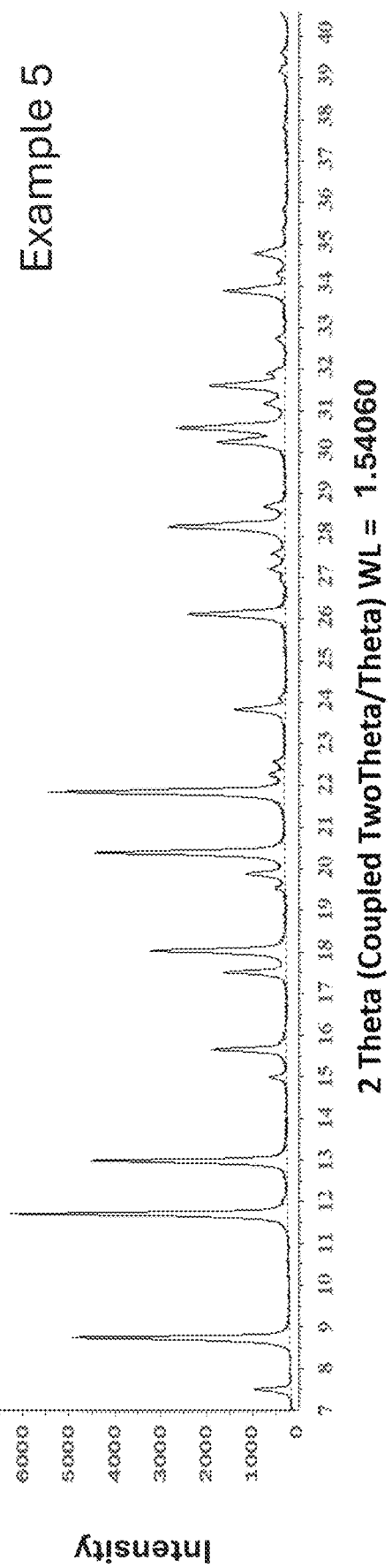

| WO | 2019/224086 A1 | 11/2019 |
|----|----------------|---------|
| WO | 2019/224087 A1 | 11/2019 |

OTHER PUBLICATIONS

Raul F. Lobo et al.Synthesis and Rietveld Refinement of the Small-Pore Zeolite SSZ-16 Chemistry of Materials, 8(10), 2409-2411, 1996, pp. 2409-2411 (cited in specification).

Song-Ho Lee et al., Zeolite synthesis in the presence of flexible diquaternary alkylammonium ions (C2H5)3N+(CH2)nN+(C2H5)3 with n=3-10 as structure-directing agents, Micropor. Mesopor. Mat., Elseveir, 60 (2003) 237-249 (submitted in copending U.S. Appl. No. 17/764,264).

R.H. Archer et al.,Imidazolium structure directing agents in zeolite synthesis: Exploring guest/host relationships in the synthesis of SSZ-70, Microp. Mesopor. Mat., Elseveir, 130 (2010) 255-265 (submitted in copending U.S. Appl. No. 17/764,264).

Martin Nuria et al. "Cage-based small pore catalysts for NH3-SCR prepared by combining bulky organic structure directing agents with modified zeolites as reagents" Applied Catalysis B: Environmental, Elsevier, Amsterdam, NL, vol. 217, May 29, 2017 (May 29, 2017), pp. 125-136 DOI: 10.1016/J.APCATB.2017.05.082.

Dustin W Fickel et al. "The ammonia selective catalytic reduction activity of copperexchanged small-pore zeolites" Applied Catalysis B: Environmental, Elsevier, Amsterdam, NL, vol. 102, No. 3, Dec. 9, 2010 (Dec. 9, 2010), pp. 441-448, [retrieved on Dec. 16, 2010].

Wang Aiyong et al. "NA3-SCR on Cu, Fe and Cu+Fe exchanged beta and SSZ-13 catalysts: Hydrothermal aging and propylene poisoning effects" Catalysis Today, vol. 320, Jan. 2019 (Jan. 2019), pp. 91-99 DOI: 10.1016/J.CATTOD.2017.09.061 ISSN: 0920-5861, XP085513181.

Xiaojiao Liu et al. "Ammonia selective catalytic reduction of NO over Ce—Fe/CuSSZ-13 catalysts" RSC Advances, vol. 5, No. 104, Jan. 1, 2015 (Jan. 1, 2015), pp. 85453-85459 DOI: 10.1039/C5RA16072C XP055552933.

Derua Wang et al. "Hollow nanocrystals of silicoaluminophosphate molecular sieves synthesized by an aminothermal co-templating strategy" CrystEngComm. (2016), 18(6), 1000-1008 DOI: DOI https://doi.org/10.1039/C5CE01798J.

Masaru Ogura et al. "A Collective Case Screening of the Zeolites made in Japan for High Performance NH3-SCR of NOx." Bulletin of the Chemical Society of Japan 2018, vol. 91, No. 3 DOI: https://doi.org/10.1246/bcsj.20170352 (cited in specification).

International Search Report dated Jul. 10, 2020 in counterpart Appln. No. PCT /EP2020/060474.

\* cited by examiner

RAPID SYNTHESIS OF A CATALYST COMPRISING A ZEOLITE HAVING AN AFX STRUCTURE AND AT LEAST ONE TRANSITION METAL FOR SELECTIVE NOX REDUCTION

CROSS-REFERENCE TO RELATED APPLICATIONS

This application is a U.S. national phase application filed under 35 U.S.C. § 371 of International Application No. PCT/EP2020/060474, filed Apr. 14, 2020, designating the United States, which claims priority from French Patent Application No. 19/04.198 filed Apr. 19, 2019, which are hereby incorporated herein by reference in their entirety for all purposes.

TECHNICAL FIELD

The subject of the invention is a process for preparing a catalyst based on a zeolite of AFX structural type obtained by rapid synthesis and on at least one transition metal, the catalyst prepared or capable of being prepared by the process, and the process for the selective catalytic reduction of NOx using said catalyst in the presence of a reducing agent, in particular in internal combustion engines.

PRIOR ART

Emissions of nitrogen oxides (NOx) resulting from the combustion of fossil fuels are a serious concern for society. Increasingly stringent standards have been put in place by government authorities in order to limit the impact of combustion emissions on the environment and on health. For light vehicles in Europe, under the Euro 6c/Euro 6d-TEMP regulations, emissions of NOx and of particles must not exceed a very low level in all operating conditions. The new WLTC test cycle (Worldwide Harmonized Light Vehicles Test Cycle) and the Real Driving Emissions (RDE) regulation combined with compliance factors require the development of a highly effective pollution control system in order to meet these targets. Selective catalytic reduction (SCR) has emerged as an effective technology for removing nitrogen oxides from the oxygen-rich exhaust gases that are typical of diesel and spark-ignition engines in lean-mixture mode. Selective catalytic reduction is carried out using a reducing agent, generally ammonia, and can therefore be referred to as $NH_3$—SCR. The ammonia ($NH_3$) involved in the SCR process is usually generated via the decomposition of an aqueous urea solution (AdBlue or DEF) and produces $N_2$ and $H_2O$ when reacted with NOx.

Zeolites exchanged with transition metals are used in particular as catalysts for $NH_3$—SCR applications in transport. Small-pore zeolites, particularly copper-exchanged chabazites, are particularly suitable. They exist commercially in the form of silicoaluminophosphate Cu-SAPO-34 and aluminosilicates Cu—SSZ-13 (or Cu—SSZ-62). Their hydrothermal resistance and NOx conversion efficiency make them the current standards. However, as the standards become increasingly restrictive, there is a need to further improve the performance of the catalysts.

The use of zeolites of AFX structural type for $NH_3$—SCR applications is known, but few studies evaluate the efficiency of catalysts that use this zeolite.

Fickel et al. (Fickel, D. W., & Lobo, R. F. (2009), The Journal of Physical Chemistry C, 114(3), 1633-1640) have studied the use of a copper-exchanged SSZ-16 (AFX structural type) for the removal of NOx. This zeolite is synthesized in accordance with the U.S. Pat. No. 5,194,235, in which copper is introduced by ion exchange using copper(II) sulfate at 80° C. for 1 h. Recent results (Fickel, D. W., D'Addio, E., Lauterbach, J. A., & Lobo, R. F. (2011), 102(3), 441-448) show excellent conversion and good hydrothermal resistance for copper loading at 3.78% by weight.

Work on the synthesis of zeolites of AFX structural type has been carried out with various organic structural agents (Lobo, R. F., Zones, S. I., & Medrud, R. C. (1996), Chemistry of Materials, 8(10), 2409-2411) together with synthesis optimization work (Hrabanek, P., Zikanova, A., Supinkova, T., Drahokoupil, J., Fila, V., Lhotka, M., Bernauer, B. (2016), Microporous and Mesoporous Materials, 228, 107-115).

Wang et al. (Wang, D. et al., CrystEngComm., (2016), 18(6), 1000-1008) have studied replacing the structuring agent TMHD with a TEA-TMA mixture for the synthesis of the silicoaluminophosphate SAPO-56 and obtained undesired SAPO-34 and SAPO-20 phases. The incorporation of transition metals is not discussed.

Application US 2016/0137518 describes a quasi-pure AFX zeolite, its synthesis from sources of silica and alumina in the presence of a structuring agent of 1,3-bis(1-adamantyl)imidazolium hydroxide type, the preparation of a catalyst based on an AFX zeolite exchanged with a transition metal, and the use thereof for $NH_3$—SCR applications. No particular form of AFX zeolite is mentioned.

More recently, the application US 2018/0093259 discloses the synthesis of small-pore zeolites, such as the zeolite of AFX structural type, from an FAU-type zeolite in the presence of an organic structuring agent, such as 1,3-bis(1-adamantyl)imidazolium hydroxide, and a source of alkaline-earth metal. It also discloses applications of the zeolite of AFX structural type obtained, in particular the use of this zeolite as an NOx reduction catalyst, following exchange with a metal such as iron. At the same time, the application US 2016/0096169A1 discloses the use, in the conversion of NOx, of a catalyst based on a metal-exchanged zeolite of AFX structural type having an Si/Al ratio ranging from 15 to 50, the AFX zeolite being obtained from a structuring agent of 1,3-bis(1-adamantyl)imidazolium hydroxide type. The results obtained, in the conversion of NOx, show in particular a selectivity of the catalysts prepared in accordance with applications US 2018/0093259 and US 2016/0096169 toward nitrous oxide not exceeding 20 ppm.

Document JP 2014-148441 describes the synthesis of a solid related to an AFX zeolite, in particular a copper-containing SAPO-56 which can be used for $NO_x$ reduction. The solid is synthesized and then added to a mixture comprising an alcohol and a copper salt, the whole mixture being calcined. The copper is therefore added after the formation of the solid SAPO-56 related to the zeolite of AFX structural type. This exchanged solid appears to have increased resistance to the presence of water.

Ogura et al. (Bull. Chem. Soc. Jpn. 2018, 91, 355-361) demonstrate the very good activity of a copper-exchanged zeolite of SSZ-16 type as compared with other zeolitic structures, even after hydrothermal aging.

WO 2017/080722 discloses the direct synthesis of a zeolite comprising copper. This synthesis requires starting from a zeolite of FAU structural type and using a TEPA complexing agent and an $M(OH)_x$ element to obtain zeolites of various types, mainly of CHA type. Zeolites of ANA, ABW, PHI and GME type are also produced.

The applicant has discovered that a catalyst based on a zeolite of AFX structural type, prepared in accordance with a particular rapid synthesis method, and on at least one transition metal, in particular copper, exhibited advantageous performance in terms of $NO_x$ conversion and selectivity toward $N_2O$. The $NO_x$ conversion performance, especially at low temperature (T<250° C.), is in particular better than that obtained with prior art catalysts, such as catalysts based on a copper-exchanged zeolite of AFX structural type, while still retaining good selectivity toward nitrous oxide $N_2O$.

SUMMARY OF THE INVENTION

The invention relates to a process for preparing a catalyst based on a zeolite of AFX structural type and on at least one transition metal, comprising at least the following steps:
  i) the mixing, in an aqueous medium, of at least one source of at least one silicon oxide $SiO_2$, of at least one source of at least one aluminium oxide $Al_2O_3$, of an organic nitrogen-comprising compound R, also referred to as specific structuring agent, 1,6-bis(methylpiperidinium)hexane dihydroxide, of at least one alkali metal and/or one alkaline-earth metal M with a valency n, n being an integer greater than or equal to 1, the reaction mixture having the following molar composition:
  $SiO_2/Al_2O_3$ between 2.00 and 100, preferably between 12 and 40
  $H_2O/SiO_2$ between 5 and 60, preferably between 10 and 40
  $R/SiO_2$ between 0.05 and 0.50, preferably between 0.10 and 0.40
  $M_{2/n}O/SiO_2$ between 0.05 and 0.40, preferably between 0.15 and 0.30,
wherein M is one or more alkali and/or alkaline-earth metal(s) chosen from lithium, sodium, potassium, calcium, magnesium and a mixture of at least two of these metals, very preferably M is sodium, step i) being performed for a time enabling a homogeneous mixture known as a precursor gel to be obtained;
  ii) the hydrothermal treatment of said precursor gel obtained at the end of step i) under autogenous pressure at a temperature of between 120° C. and 250° C., preferably of between 150° C. and 230° C., for a time of between 2 and 12 hours, preferably of between 2 and 10 hours, until said zeolite of AFX structural type forms,
  iii) at least one ion exchange comprising bringing said solid obtained at the end of the previous step into contact with a solution comprising at least one species capable of releasing a transition metal, in particular copper, in solution in reactive form, with stirring at ambient temperature for a time of between 1 hour and 2 days;
  iv) a heat treatment advantageously comprising drying of the solid obtained in the previous step at a temperature of between 20 and 150° C., preferably of between 60 and 100° C., for a time of between 2 and 24 hours, followed by at least one calcination under—optionally dry—air at a temperature of between 450 and 700° C., preferably of between 500 and 600° C., for a time of between 2 and 20 hours, preferably of between 6 and 16 hours, more preferably of between 8 and 13 hours, the flow rate of optionally dry air being preferably between 0.5 and 1.5 L/h/g of solid to be treated, more preferably between 0.7 and 1.2 L/h/g of solid to be treated.

At least one source of at least one silicon oxide $SiO_2$ and/or at least one source of at least one aluminium oxide $Al_2O_3$ may be at least one zeolite of FAU structural type having a molar $SiO_2/Al_2O_3$ ratio of between 2.00 and 100.

Steps iii) and iv) may be reversed and/or optionally repeated.

Seed crystals of a zeolite of AFX structural type may be added to the reaction mixture of step i), preferably in an amount of between 0.01% and 10% of the total mass of the sources of said tetravalent (Si) and trivalent (Al) elements in their oxide form ($SiO_2$ and $Al_2O_3$) which are used in the reaction mixture, said seed crystals not being taken into account in the total mass of the sources of the tetravalent and trivalent elements.

Step i) may comprise a step of maturation of the reaction mixture at a temperature of between 20 and 80° C., with or without stirring, for a time of between 30 minutes and 24 hours.

Step iii) of ion exchange is advantageously carried out by bringing the solid into contact with a solution comprising a single species capable of releasing a transition metal or by successively bringing the solid into contact with different solutions each comprising at least one, preferably a single, species capable of releasing a transition metal, the transition metals of the different solutions preferably being different from each other.

Said at least one transition metal released in the exchange solution of step iii) may be selected from the group made up of the following elements: Ti, V, Mn, Mo, Fe, Co, Cu, Cr, Zn, Nb, Ce, Zr, Rh, Pd, Pt, Au, W, Ag, preferably from the group made up of the following elements: Fe, Cu, Nb, Ce or Mn, more preferably from Fe or Cu, and even more preferably said transition metal is Cu.

The content of transition metal(s) introduced by the ion exchange step iii) is advantageously between 0.5% and 6% by mass, preferably between 0.5% and 5% by mass, more preferably between 1% and 4% by mass, relative to the total mass of the anhydrous final catalyst.

The invention also relates to the catalyst based on an AFX zeolite and on at least one transition metal capable of being obtained or directly obtained by the preparation process.

The transition metal or metals may be selected from the group made up of the following elements: Ti, V, Mn, Mo, Fe, Co, Cu, Cr, Zn, Nb, Ce, Zr, Rh, Pd, Pt, Au, W, Ag, preferably from the group made up of the following elements: Fe, Cu, Nb, Ce or Mn, more preferably from Fe or Cu, and even more preferably said transition metal is Cu.

The total content of the transition metals is advantageously between 0.5% and 6% by mass, preferably between 0.5% and 5% by mass, more preferably between 1% and 4% by mass, relative to the total mass of the anhydrous final catalyst.

In one embodiment, the catalyst comprises copper, alone, at a content of between 0.5% and 6% by weight, preferably between 0.5% and 5% by weight, very preferably between 1% and 4% by weight, relative to the total mass of the anhydrous final catalyst.

In another embodiment, the catalyst comprises copper in combination with at least one other transition metal chosen from the group made up of Fe, Nb, Ce, Mn, the content of copper in the catalyst being between 0.05% and 2% by mass, preferably between 0.5% and 2% by mass, the content of said at least one other transition metal being between 1% and 4% by mass, relative to the total mass of the anhydrous final catalyst.

In yet another embodiment, the catalyst comprises iron in combination with another metal chosen from the group made up of Cu, Nb, Ce, Mn, the iron content being between 0.05% and 2% by mass, preferably between 0.5% and 2% by mass, the content of said other transition metal being between 1% and 4% by mass, relative to the total mass of the anhydrous final catalyst.

The invention also relates to a process for the selective reduction of $NO_x$ by a reducing agent such as $NH_3$ or Hz, employing a catalyst as described above or a catalyst capable of being obtained or directly obtained by the preparation process.

The catalyst may be formed by deposition in the form of a coating on a honeycomb structure or a plate structure.

The honeycomb structure may be formed by parallel channels which are open at both ends or may comprise porous filtering walls in the case of which the adjacent parallel channels are alternately blocked at either side of the channels.

The amount of catalyst deposited on said structure is advantageously between 50 and 180 g/L for the filtering structures and between 80 and 200 g/L for the structures with open channels.

The catalyst may be combined with a binder such as cerine, zirconium oxide, alumina, non-zeolitic silica-alumina, titanium oxide, a mixed oxide of cerine-zirconia type, a tungsten oxide and/or a spinel in order to be formed by deposition in the form of a coating.

Said coating may be combined with another coating having capacities for adsorbing pollutants, in particular $NO_x$, for reducing pollutants, in particular $NO_x$, or promoting the oxidation of pollutants.

Said catalyst may be in the form of an extrudate, containing up to 100% of said catalyst.

The structure coated with said catalyst or obtained by extrusion of said catalyst may be integrated into an exhaust line of an internal combustion engine.

LIST OF FIGURES

FIG. 1 shows the chemical formula of the organic nitrogen-comprising compound R which is the structuring agent used in the synthesis process according to the invention.

FIGS. 2A, 2B, 2C and 2D the X-ray diffraction patterns for the copper-containing zeolites of AFX structural type obtained according to Examples 2 to 5, respectively.

FIG. 3 shows the conversion C in % obtained during a catalytic test of the reduction of nitrogen oxides ($NO_x$) by ammonia ($NH_3$) in the presence of oxygen ($O_2$) under standard SCR conditions as a function of temperature T in ° C. for a catalyst according to example 2 (CuAFX, according to the invention, curve symbolized by diamonds), a catalyst according to example 3 (CuAFX780, according to the invention, curve symbolized by triangles), a catalyst according to example 4 (CuAFX720, according to the invention, curve symbolized by squares), a catalyst according to example 5 (CuAFX600, according to the invention, curve symbolized by circles) and a catalyst according to example 6 (CuSSZ16, comparative, curve symbolized by crosses).

Other characteristics and advantages of the synthesis process according to the invention, the catalyst according to the invention and the use according to the invention will become apparent on reading the following description of non-limiting exemplary embodiments with reference to the appended figures described below.

DESCRIPTION OF EMBODIMENTS

The present invention relates to a process for preparing a catalyst comprising a zeolite of AFX structural type and at least one transition metal, comprising at least the following steps:

i) the mixing, in an aqueous medium, of at least one source of at least one silicon oxide $SiO_2$, of at least one source of at least one aluminium oxide $Al_2O_3$, or of at least one zeolite of FAU structural type having a molar $SiO_2/Al_2O_3$ ratio of between 2.00 and 100, of an organic nitrogen-comprising compound R, also referred to as specific structuring agent, 1,6-bis(methylpiperidinium)hexane dihydroxide, of at least one alkali metal and/or one alkaline-earth metal M with a valency n, n being an integer greater than or equal to 1, the reaction mixture having the following molar composition:

$SiO_2/Al_2O_3$ between 2 and 100, preferably between 12 and 40

$H_2O/SiO_2$ between 5 and 60, preferably between 10 and 40

$R/SiO_2$ between 0.05 and 0.50, preferably between 0.10 and 0.40

$M_{2/n}O/SiO_2$ between 0.05 and 0.40, preferably between 0.15 and 0.30, wherein M is one or more alkali and/or alkaline-earth metal(s) chosen from lithium, sodium, potassium, calcium, magnesium and a mixture of at least two of these metals, very preferably M is sodium, step i) being performed for a time enabling a homogeneous mixture known as a precursor gel to be obtained;

ii) the hydrothermal treatment of said precursor gel obtained at the end of step i) under autogenous pressure at a temperature of between 120° C. and 250° C., preferably of between 150° C. and 230° C., for a time of between 2 and 12 hours, preferably of between 2 and 10 hours, until said zeolite of AFX structural type forms, iii) at least one ion exchange comprising bringing said solid obtained at the end of the step ii) into contact with a solution comprising at least one species capable of releasing a transition metal, in particular copper, in solution in reactive form, with stirring at ambient temperature for a time of between 1 hour and 2 days;

iv) a heat treatment advantageously comprising drying of the solid obtained in the previous step at a temperature of between 20 and 150° C., preferably of between 60 and 100° C., for a time of between 2 and 24 hours, followed by at least one calcination under—optionally dry—air at a temperature of between 450 and 700° C., preferably of between 500 and 600° C., for a time of between 2 and 20 hours, preferably of between 6 and 16 hours, more preferably of between 8 and 13 hours, the flow rate of optionally dry air being preferably between 0.5 and 1.5 L/h/g of solid to be treated, more preferably between 0.7 and 1.2 L/h/g of solid to be treated.

Steps iii) and iv) may be reversed and/or optionally repeated.

The present invention also relates to the catalyst comprising a zeolite of AFX structural type and at least one transition metal capable of being obtained or directly obtained by the preparation process described above.

The invention lastly relates to the use of a catalyst according to the invention in a process for the selective catalytic reduction of $NO_x$ in the presence of a reducing agent.

The Catalyst

The catalyst according to the invention comprises at least one zeolite of AFX type and at least one additional transition metal, preferably copper.

According to the invention, the transition metal or metals included in the catalyst is/are selected from the elements of the group made up of the elements of groups 3 to 12 of the periodic table of the elements, including the lanthanides. In particular, the transition metal or metals included in the catalyst is/are selected from the group formed by the following elements: Ti, V, Mn, Mo, Fe, Co, Cu, Cr, Zn, Nb, Ce, Zr, Rh, Pd, Pt, Au, W, Ag.

Preferably, the catalyst according to the invention comprises copper, alone or in combination with at least one other transition metal chosen from the group of elements listed above; in particular Fe, Nb, Ce, Mn.

The total content of the transition metals is advantageously between 0.5% and 6% by mass, preferably between 0.5% and 5% by mass, and even more preferably between 1% and 4% by mass, relative to the total mass of the final catalyst in its anhydrous form.

In the case of catalysts containing only copper as transition metal, the content is advantageously between 0.5% and 6%, preferably between 0.5% and 5%, and more preferably between 1% and 4% by weight, relative to the total mass of the anhydrous final catalyst.

In the case of catalysts comprising copper and another element such as, preferably, Fe, Nb, Ce, Mn, the content of copper in the catalyst is between 0.05% and 2% by mass, preferably between 0.5% and 2% by mass, while the content of the other transition metal is preferably between 1% and 4% by mass, the contents of transition metals being given as percentages by mass relative to the total mass of the final dry catalyst.

In the case of catalysts containing only iron as transition metal, the content of iron is between 0.5% and 4% and even more preferably between 1.5% and 3.5%, relative to the total mass of the anhydrous final catalyst.

In the case of catalysts comprising iron and another element such as, preferably, Cu, Nb, Ce, Mn, the content of iron in the catalyst is between 0.05% and 2% by mass, preferably between 0.5% and 2% by mass, while the content of the other transition metal is preferably between 1% and 4% by mass, the contents of transition metals being given as percentages by mass relative to the total mass of the final dry catalyst.

The catalyst according to the invention may also comprise other elements, such as for example alkali and/or alkaline-earth metals, for example sodium, originating in particular from the synthesis, in particular of the compounds of the reaction medium of step i) of the process for preparing said catalyst.

Process for Preparing the Catalyst

Mixing Step i)

This step implements the mixing, in an aqueous medium, of at least one source of at least one silicon oxide $SiO_2$, of at least one source of at least one aluminium oxide $Al_2O_3$, and/or of at least one zeolite of FAU structural type having a molar $SiO_2/Al_2O_3$ ratio of between 2.00 and 100, of an organic nitrogen-comprising compound R, also referred to as specific structuring agent, 1,6-bis(methylpiperidinium) hexane dihydroxide, of at least one alkali metal and/or one alkaline-earth metal M with a valency n, n being an integer greater than or equal to 1, the reaction mixture having the following molar composition:

$SiO_2/Al_2O_3$ between 2 and 100, preferably between 12 and 40

$H_2O/SiO_2$ between 5 and 60, preferably between 10 and 40

$R/SiO_2$ between 0.05 and 0.50, preferably between 0.10 and 0.40

$M_{2/n}O/SiO_2$ between 0.05 and 0.40, preferably between 0.15 and 0.30, wherein M is one or more alkali and/or alkaline-earth metal(s) chosen from lithium, sodium, potassium, calcium, magnesium and a mixture of at least two of these metals, very preferably M is sodium, step i) being performed for a time enabling a homogeneous mixture known as a precursor gel to be obtained.

In the molar composition of the reaction mixture above and throughout the description:

$SiO_2$ denotes the molar amount of the tetravalent element silicon (Si), expressed in oxide form, and $Al_2O_3$ denotes the molar amount of the trivalent element aluminium (Al), expressed in oxide form, $H_2O$ is the molar amount of water present in the reaction mixture, R is the molar amount of said organic nitrogen-comprising compound, $M_{2/n}O$ is the molar amount expressed in oxide form $M_{2/n}O$ by the source of alkali metal and/or alkaline-earth metal.

In accordance with the invention, at least one source of oxide $SiO_2$ is incorporated into the mixture for carrying out step (i) of the preparation process. The source of silicon may be any one of said sources commonly used for zeolite synthesis, for example powdered silica, silicic acid, colloidal silica, dissolved silica or tetraethoxysilane (TEOS). Among the powdered silicas, use may be made of precipitated silicas, especially those obtained by precipitation from a solution of alkali metal silicate, fumed silicas, for example Cab-O-Sil, and silica gels. Colloidal silicas having various particle sizes, for example a mean equivalent diameter of between 10 and 15 nm or between 40 and 50 nm, may be used, such as those sold under registered trademarks such as Ludox. Preferably, the source of silicon is Ludox HS-40. It is also possible to use, as source of oxide $SiO_2$, at least one zeolite of FAU structural type having a molar $SiO_2/Al_2O_3$ ratio of between 2.00 and 100, alone or in a mixture with other sources of $SiO_2$.

The source of aluminium is preferably aluminium hydroxide or an aluminium salt, for example chloride, nitrate or sulfate, a sodium aluminate, an aluminium alkoxide, or alumina itself, preferably in hydrated or hydratable form, for instance colloidal alumina, pseudoboehmite, gamma-alumina or alpha or beta alumina trihydrate. Use may also be made of mixtures of the sources mentioned above. It is also possible to use, as source of oxide $Al_2O_3$, at least one zeolite of FAU structural type having a molar $SiO_2/Al_2O_3$ ratio of between 2.00 and 100, alone or in a mixture with other sources of $Al_2O_3$.

In accordance with the invention, at least one source of silica and/or at least one source of aluminium may also be at least one zeolite of FAU structural type having a molar $SiO_2/Al_2O_3$ ratio of between 2.00 and 100.

In accordance with the invention, R is a nitrogen-comprising organic compound, 1,6-bis(methylpiperidinium) hexane dihydroxide, said compound being incorporated into the reaction mixture for the implementation of step (i), as organic structuring agent.

In accordance with the invention, at least one source of at least one alkali metal and/or alkaline-earth metal M with a valency n is used in the reaction mixture of step i), n being an integer greater than or equal to 1, M preferably being chosen from lithium, potassium, sodium, magnesium and calcium and a mixture of at least two of these metals. Very preferably, M is sodium.

The source of at least one alkali metal and/or alkaline-earth metal M is preferably sodium hydroxide.

It may be advantageous to add seeds of a zeolite of AFX structural type to the reaction mixture during said step i) of the process of the invention so as to reduce the time needed for the formation of the crystals of a zeolite of AFX structural type and/or the total crystallization time. Said seed crystals also promote the formation of said zeolite of AFX structural type to the detriment of impurities. Such seeds comprise crystalline solids, in particular crystals of a zeolite of AFX structural type. The seed crystals are generally added in a proportion of between 0.01% and 10% of the total mass of the sources of said tetravalent (silicon) and trivalent (aluminium) elements in oxide form which are used in the reaction mixture, said seed crystals not being taken into account in the total mass of the sources of the tetravalent and trivalent elements. Said seeds are not taken into account either for determining the composition of the reaction mixture and/or of the gel, defined above, i.e. in the determination of the various molar ratios of the composition of the reaction mixture.

The mixing step i) is performed until a homogeneous mixture is obtained, preferably for a time of greater than or equal to 10 minutes, preferably with stirring by any system known to those skilled in the art, at a low or high shear rate.

At the end of step i), a homogeneous precursor gel is obtained.

It may be advantageous to perform a maturation of the reaction mixture during said step i) of the process of the invention, before the hydrothermal crystallization, so as to control the size of the crystals of a zeolite of AFX structural type. Said maturation also promotes the formation of said zeolite of AFX structural type to the detriment of impurities. The maturation of the reaction mixture during said step i) of the process of the invention may be performed at ambient temperature or at a temperature of between 20 and 80° C., with or without stirring, for a time of between 30 minutes and 24 hours.

Hydrothermal Treatment Step ii)

In accordance with step ii) of the process according to the invention, the precursor gel obtained at the end of step i) is subjected to a hydrothermal treatment, preferentially carried out at a temperature of between 120° C. and 250° C. for a time of between 2 and 12 hours, until said zeolite of AFX structural type (or "crystallized solid") forms.

The precursor gel is advantageously placed under hydrothermal conditions under an autogenous reaction pressure, optionally with addition of gas, for example nitrogen, at a temperature preferably of between 120° C. and 250° C., preferably between 150° C. and 230° C., until a zeolite of AFX structural type has fully crystallized.

The time required to achieve crystallization varies between 2 and 12 hours, preferably between 2 and 10 hours, and more preferably between 2 and 8 hours.

The reaction is generally performed with or without stirring, preferably with stirring. The stirring system that may be used is any system known to those skilled in the art, for example inclined paddles with counter-blades, stirring turbomixers or endless screws.

Exchange Step iii)

The process for preparing the catalyst according to the invention comprises at least one step of ion exchange, comprising bringing the crystallized solid obtained at the end of the previous step, that is to say the AFX zeolite obtained at the end of step ii) or the dried and calcined AFX zeolite obtained at the end of step iv) in the preferred case where steps iii) and iv) are reversed, into contact with at least one solution comprising at least one species capable of releasing a transition metal, in particular copper, in solution in reactive form, with stirring at ambient temperature for a time of between 1 hour and 2 days, advantageously for a time of between 6 and 12 hours, the concentration of said species capable of releasing the transition metal in said solution depending on the amount of transition metal that is intended to be incorporated into said crystallized solid.

It is also advantageous to obtain the protonated form of the zeolite of AFX structural type after step ii). Said hydrogen form may be obtained by performing an ion exchange with an acid, in particular a strong mineral acid such as hydrochloric, sulfuric or nitric acid, or with a compound such as ammonium chloride, sulfate or nitrate, before the ion exchange with the transition metal(s).

The transition metal released in the exchange solution is selected from the group made up of the following elements: Ti, V, Mn, Mo, Fe, Co, Cu, Cr, Zn, Nb, Ce, Zr, Rh, Pd, Pt, Au, W, Ag. The transition metal is preferably Fe, Cu, Nb, Ce or Mn, preferably Cu.

According to the invention, "species capable of releasing a transition metal" is understood to mean a species which is capable of dissociating in an aqueous medium, such as for example sulfates, nitrates, chlorides, oxalates, or organometallic complexes of a transition metal, or mixtures thereof. Preferably, the species capable of releasing a transition metal is a sulfate or a nitrate of said transition metal.

According to the invention, the solution with which the crystallized solid or dried and calcined crystallized solid is brought into contact comprises at least one species capable of releasing a transition metal, preferably a single species capable of releasing a transition metal, preferably iron or copper, preferentially copper.

Advantageously, the process for preparing the catalyst according to the invention comprises a step iii) of ion exchanges by bringing the crystallized solid into contact with a solution comprising a species capable of releasing a transition metal or by successively bringing the solid into contact with a plurality of solutions each comprising a species capable of releasing a transition metal, the various solutions comprising different species capable of releasing a transition metal.

At the end of the exchange, the solid obtained is advantageously filtered off, washed and then dried to obtain said catalyst in powder form.

The total amount of transition metal, preferably copper, contained in said final catalyst is between 0.5% and 6% by mass relative to the total mass of the catalyst in its anhydrous form.

According to one embodiment, the catalyst according to the invention is prepared by a process comprising a step iii) of ion exchange, the solid or the dried and calcined solid being brought into contact with a solution comprising a species capable of releasing copper in solution in reactive form. Advantageously, the total amount of copper contained in said final catalyst, that is to say at the end of the preparation process according to the invention, is between 0.5% and 6%, preferably between 1% and 4% by mass, all the percentages being percentages by mass relative to the total mass of the final catalyst according to the invention in its anhydrous form, obtained at the end of the preparation process.

Heat Treatment Step iv)

The preparation process according to the invention comprises a step iv) of heat treatment performed at the end of the previous step, i.e. at the end of the hydrothermal treatment step ii) or at the end of the ion-exchange step iii), preferably at the end of the ion-exchange step iii). Step iii) and step iv)

of the preparation process may advantageously be reversed. Each of steps iii) and iv) may also optionally be repeated.

Said step iv) of heat treatment comprises drying of the solid at a temperature of between 20 and 150° C., preferably of between 60 and 100° C., advantageously for a time of between 2 and 24 hours, followed by at least one calcination under—optionally dry—air at a temperature advantageously of between 450 and 700° C., preferably of between 500 and 600° C., for a time of between 2 and 20 hours, preferably of between 6 and 16 hours, more preferably of between 8 and 13 hours, the flow rate of optionally dry air being preferably between 0.5 and 1.5 L/h/g of solid to be treated, more preferably between 0.7 and 1.2 L/h/g of solid to be treated. The calcination may be preceded by a gradual temperature increase.

The catalyst obtained at the end of the heat treatment step iv) is devoid of any organic species, in particular devoid of the organic structuring agent R.

In particular, the catalyst obtained by a process comprising at least steps i), ii), iii) and iv) as described above has improved $NO_x$ conversion properties.

Characterization of the Catalyst Prepared According to the Invention

The catalyst comprises a zeolite of AFX structure in accordance with the classification of the International Zeolite Association (IZA), exchanged by at least one transition metal. This structure is characterized by X-ray diffraction (XRD).

The X-ray diffraction (XRD) pattern is obtained by radiocrystallographic analysis by means of a diffractometer using the conventional powder method with copper Kαi radiation ($\lambda$=1.5406 Å). On the basis of the position of the diffraction peaks represented by the angle $2\theta$, the lattice constant distances $d_{hkl}$ characteristic of the sample are calculated using the Bragg relationship. The measurement error $\Delta(d_{hkl})$ on $d_{hkl}$ is calculated by means of the Bragg relationship as a function of the absolute error $\Delta(2\theta)$ assigned to the measurement of $2\theta$. An absolute error $\Delta(2\theta)$ equal to ±0.02° is commonly accepted. The relative intensity $I_{rel}$ assigned to each value of $d_{hkl}$ is measured according to the height of the corresponding diffraction peak. Comparison of the diffractogram with the ICDD (International Centre for Diffraction Data) database records using software such as for example DIFFRACT.SUITE also makes it possible to identify the crystalline phases present in the material obtained.

The qualitative and quantitative analysis of the chemical species present in the materials obtained is carried out by X-ray fluorescence (XRF) spectrometry. This is a technique of chemical analysis using a physical property of matter, the X-ray fluorescence. The spectrum of X-rays emitted by the material is characteristic of the composition of the sample; by analyzing this spectrum, it is possible to deduce therefrom the elemental composition, that is to say the mass concentrations of elements.

The loss on ignition (LOI) of the catalyst obtained after the drying step (and before calcination) or after the calcination step of step iv) of the process according to the invention is generally between 5% and 18% by weight. The loss on ignition of a sample, referred to by the acronym LOI, corresponds to the difference in the mass of the sample before and after a heat treatment at 1000° C. for 2 hours. It is expressed in % corresponding to the percentage loss of mass. The loss on ignition corresponds in general to the loss of solvent (such as water) contained in the solid, but also to the removal of organic compounds contained in the inorganic solid constituents.

Process for the Selective Reduction of $NO_x$ by a Reducing Agent Such as $NH_3$ or $H_2$ Employing the Catalyst According to the Invention The invention also relates to the use of the catalyst according to the invention, directly prepared or capable of being prepared by the process described above, for the selective reduction of $NO_x$ by a reducing agent such as $NH_3$ or $H_2$, advantageously formed by deposition in the form of a coating (or "washcoat") on a honeycomb structure, primarily for mobile applications, or on a plate structure, as found in particular for stationary applications.

The honeycomb structure is formed of parallel channels which are open at both ends ("flow-through channels") or comprises porous filtering walls, in which case the adjacent parallel channels are alternately blocked at either side of the channels to force the gas flow to pass through the wall ("wall-flow monolith"). Said honeycomb structure thus coated constitutes a catalytic block. Said structure may be composed of cordierite, silicon carbide (SiC), aluminium titanate (AlTi), alpha-alumina, mullite, or any other material having a porosity of between 30% and 70%. Said structure may be formed in metal sheet, in stainless steel containing chromium and aluminium, FeCrAl steel.

The amount of catalyst according to the invention deposited on said structure is between 50 and 180 g/L for the filtering structures and between 80 and 200 g/L for the structures with open channels.

The actual coating ("washcoat") comprises the catalyst according to the invention, advantageously in combination with a binder such as cerine, zirconium oxide, alumina, non-zeolitic silica-alumina, titanium oxide, a mixed oxide of cerine-zirconia type, a tungsten oxide, a spinel. Said coating is advantageously applied to said structure by a deposition method known as washcoating, which consists in soaking the monolith in a suspension (or slurry) of powdered catalyst according to the invention in a solvent, preferably water, and optionally binders, metal oxides, stabilizers or other promoters. This soaking step may be repeated until the desired amount of coating is obtained. In certain cases the slurry may also be sprayed inside the monolith. Once the coating has been deposited, the monolith is calcined at a temperature of 300 to 600° C. for 1 to 10 hours.

Said structure may be coated with one or more coatings. The coating comprising the catalyst according to the invention is advantageously combined with, i.e. covers or is covered by, another coating having capacities for adsorbing pollutants, in particular $NO_x$, for reducing pollutants, in particular $NO_x$, or promoting the oxidation of pollutants, in particular that of ammonia.

Another possibility is for the catalyst to be in the form of an extrudate. In this case, the structure obtained may contain up to 100% of catalyst according to the invention.

Said structure coated with the catalyst according to the invention is advantageously integrated into an exhaust line of an internal combustion engine operating mainly in lean-mixture mode, that is to say with excess air relative to the stoichiometry of the combustion reaction, as is the case with diesel engines for example. Under these engine operating conditions, the exhaust gases contain in particular the following pollutants: soot, unburned hydrocarbons (HCs), carbon monoxide (CO), nitrogen oxides ($NO_x$). Upstream of said structure coated with the catalyst according to the invention may be placed an oxidation catalyst, the function of which is to oxidize the HCs and CO, and a filter for removing soot from the exhaust gases, the function of said coated structure being to remove the $NO_x$, its operating range being between 100 and 900° C. and preferably between 200° C. and 500° C.

Advantages of the Invention

The catalyst according to the invention, based on a zeolite of AFX structural type obtained by rapid synthesis and on at least one transition metal, in particular copper, has improved properties compared to the prior art catalysts. In particular, the use of the catalyst according to the invention makes it possible to obtain lower light-off temperatures for the $NO_x$ conversion reaction and an improved $NO_x$ conversion over the entire operating temperature range (150-600° C.), all while maintaining a good selectivity for $N_2O$. It also has a better resistance to hydrothermal aging, ensuring high performance even after such aging.

EXAMPLES

Example 1: Preparation of 1,6-bis(methylpiperidinium)hexane dihydroxide (Structuring Agent R)

50 g of 1,6-dibromohexane (0.20 mol, 99%, Alfa Aesar) are placed in a 1 L round-bottom flask containing 50 g of N-methylpiperidine (0.51 mol, 99%, Alfa Aesar) and 200 mL of ethanol. The reaction medium is stirred and refluxed for 5 hours. The mixture is then cooled to ambient temperature and then filtered. The mixture is poured into 300 mL of cold diethyl ether and the precipitate formed is then filtered off and washed with 100 mL of diethyl ether. The solid obtained is recrystallized in an ethanol/ether mixture. The solid obtained is dried under vacuum for 12 hours. 71 g of a white solid are obtained (i.e. a yield of 80%).

The product has the expected $^1H$ NMR spectrum. $^1H$ NMR ($D_2O$, ppm/TMS):1.27 (4H, m); 1.48 (4H, m); 1.61 (4H, m); 1.70 (8H, m); 2.85 (6H, s), 3.16 (12H, m).

18.9 g of $Ag_2O$ (0.08 mol, 99%, Aldrich) are placed in a 250 mL Teflon beaker containing 30 g of the prepared structuring agent 1,6-bis(methylpiperidinium)hexane dibromide (0.07 mol) and 100 mL of deionized water. The reaction medium is stirred for 12 hours in the absence of light. The mixture is then filtered. The filtrate obtained is composed of an aqueous solution of 1,6-bis(methylpiperidinium)hexane dihydroxide. Assaying of this species is performed by proton NMR using formic acid as standard.

Example 2: Preparation of a Zeolite of AFX Structural Type According to the Invention with 3% Cu Preparation of the AFX Zeolite 467.1 g of an aqueous solution of 1,6-bis(methylpiperidinium)hexane dihydroxide (18.36% by weight) prepared according to example 1 were mixed with 4.3 g of deionized water. 19.72 g of sodium hydroxide (solid, 98% by weight purity, Aldrich) are added to the above mixture, and the preparation obtained is kept stirring for 10 minutes. Subsequently, 15.56 g of sodium aluminate (53.17% $Al_2O_3$, Strem Chemicals) are incorporated and the synthesis gel is kept stirring for 15 minutes. Lastly, 243.38 g of colloidal silica (Ludox HS40, 40% $SiO_2$ by weight, Grace) and 9.76 g of seeds of an AFX zeolite obtained by a method known to those skilled in the art were incorporated into the synthesis mixture with stirring. The molar composition of the mixture, without taking into account the AFX zeolite seeds, is as follows: 100 $SiO_2$:5 $Al_2O_3$:16.7 R:22.4 $Na_2O$:1836 $H_2O$, i.e. an $SiO_2/Al_2O_3$ ratio of 20. The precursor gel is then transferred, after homogenization, into an autoclave. The autoclave is closed and then heated with an increase in temperature of 5° C./min up to 150° C. for 4 hours under autogenous pressure and with stirring at 200 rpm using a system with 4 inclined paddles. The crystallized product obtained is filtered off, washed with deionized water and then dried overnight at 100° C. The loss on ignition is 14%. The solid is then introduced into a muffle furnace where a calcination step is performed: the calcination cycle comprises an increase in temperature of 1.5° C./min up to 200° C., a steady stage at 200° C. maintained for 2 hours, an increase in temperature of 1° C./min up to 550° C., followed by a steady stage at 550° C. maintained for 12 hours, then a return to ambient temperature.

The calcined solid product was analysed by X-ray diffraction and identified as consisting of a zeolite of AFX structural type (ICDD file, PDF 04-011-1869) with a purity of greater than 99.8%. The product has a molar $SiO_2/Al_2O_3$ ratio of 10.2 as determined by XRF.

The calcined AFX zeolite is then brought into contact with a 3 M $NH_4NO_3$ solution for 1 hour with stirring at 80° C. The ratio between the volume of $NH_4NO_3$ solution and the mass of solid is 10. The solid obtained is filtered off and washed and the exchange procedure is repeated twice more under the same conditions. The final solid is separated off, washed and dried for 12 hours at 100° C. XRD analysis shows that the product obtained is a pure zeolite of AFX structural type.

The AFX zeolite in ammoniacal form is treated under a stream of air at 550° C. for 8 hours with a temperature increase gradient of 1° C./min. The product obtained is an AFX zeolite in protonated form.

Cu Ion Exchange

The calcined AFX zeolite in protonated form is brought into contact with a $[Cu(NH_3)_4](NO_3)_2$ solution for 12 hours with stirring at ambient temperature. The final solid is separated off, washed and dried for 12 hours at a temperature of 100° C.

The exchanged Cu-AFX solid obtained after the contacting with the $[Cu(NH_3)_4](NO_3)_2$ solution is calcined under a stream of air at 550° C. for 8 hours.

The calcined solid product is analyzed by X-ray diffraction and identified as a zeolite of AFX structural type (ICDD file, PDF 04-011-1869). The diffraction pattern created by this solid is given in FIG. 2A.

The product has a molar $SiO_2/Al_2O_3$ ratio of 10.2 and a percentage by mass of Cu of 3%, as determined by XRF.

The catalyst obtained is denoted CuAFX.

Example 3: Preparation of a Zeolite of AFX Structural Type According to the Invention with 3% Cu Preparation of the AFX Zeolite 29.3 g of an aqueous solution of 1,6-bis(methylpiperidinium)hexane dihydroxide (18.36% by weight) prepared according to example 1 are mixed with 41.73 g of deionized water with stirring and at ambient temperature. 0.764 g of sodium hydroxide (98% by weight, Aldrich) are dissolved in the above mixture with stirring and at ambient temperature. Subsequently, 0.675 g of amorphous aluminium hydroxide gel ($Al(OH)_3$ amorphous gel, 58.55% by mass of $Al_2O_3$, Merck), are incorporated into the synthesis mixture, this being kept stirring for half an hour at ambient temperature. As soon as a homogeneous suspension is obtained, pouring in of 7.56 g of a zeolite of FAU structural type (CBV780, $SiO_2/Al_2O_3$=98.22, Zeolyst, LOI=8.52%) is commenced and the suspension obtained is kept stirring for 30 minutes at ambient temperature. In order to promote the formation of a zeolite of AFX structural type, 0.614 g of seeds (10% relative to the mass of CBV780 zeolite) of a zeolite of AFX structural type are added to the synthesis mixture, which is kept stirring for 5 minutes. The reaction mixture then undergoes a step of maturation for 24 hours at ambient temperature with stirring (200 rpm). The molar composition of the precursor gel is as follows: 1 $SiO_2$:0.05 $Al_2O_3$:0.167 R:0.093 $Na_2O$:36.73 $H_2O$, i.e. an $SiO_2/Al_2O_3$ ratio of 20. The precursor gel is then transferred into a 160 mL stainless steel reactor fitted with a stirring system with four inclined paddles. The reactor is closed and then heated for 5 hours under autogenous pressure with an increase in temperature of 5° C./min up to 180° C. and with stirring at 200 rpm to allow the crystallization of the zeolite of AFX structural type. The crystallized product obtained is filtered off, washed with deionized water and then dried overnight at 100° C. The loss on ignition of the dried solid is 14.69%.

The solid is then introduced into a muffle furnace where a calcination step is performed: the calcination cycle comprises an increase in temperature of 1.5° C./min up to 200° C., a steady stage at 200° C. maintained for 2 hours, an increase of 1° C./min up to 550° C., followed by a steady stage at 550° C. maintained for 12 hours, then a return to ambient temperature.

The calcined solid product was analyzed by X-ray diffraction and identified as consisting of a zeolite of AFX structural type (ICDD file, PDF 04-011-1869) with a purity of greater than 99% by weight. The product has a molar $SiO_2/Al_2O_3$ ratio of 14.05 as determined by XRF.

The calcined AFX zeolite is then brought into contact with a 3 M $NH_4NO_3$ solution for 1 hour with stirring at 80° C. The ratio between the volume of $NH_4NO_3$ solution and the mass of solid is 10. The solid obtained is filtered off and washed and the exchange procedure is repeated twice more under the same conditions. The final solid is separated off, washed and dried for 12 hours at 100° C. XRD analysis shows that the product obtained is a pure zeolite of AFX structural type.

The AFX zeolite in ammoniacal form is treated under a stream of air at 550° C. for 8 hours with a temperature increase gradient of 1° C./min. The product obtained is an AFX zeolite in protonated form.

Cu Ion Exchange

The calcined AFX zeolite in protonated form is brought into contact with a $[Cu(NH_3)_4](NO_3)_2$ solution for 12 hours with stirring at ambient temperature. The final solid is separated off, washed and dried for 12 hours at a temperature of 100° C.

The exchanged Cu-AFX solid obtained after the contacting with the $[Cu(NH_3)_4](NO_3)_2$ solution is calcined under a stream of air at 550° C. for 8 hours.

The calcined solid product is analyzed by X-ray diffraction and identified as a zeolite of AFX structural type (ICDD file, PDF 04-011-1869). The diffraction pattern created by this solid is given in FIG. 2B.

The product has a molar $SiO_2/Al_2O_3$ ratio of 14.05 and a percentage by mass of Cu of 3%, as determined by XRF.

The catalyst obtained is denoted CuAFX780.

Example 4: Preparation of a Zeolite of AFX Structural Type According to the Invention with 3% Cu Preparation of the AFX Zeolite 33.37 g of an aqueous solution of 1,6-bis(methylpiperidinium)hexane dihydroxide (18.36% by weight) prepared according to example 1 are mixed with 37.15 g of deionized water with stirring and at ambient temperature. 1.72 g of sodium hydroxide (98% by weight, Aldrich) are dissolved in the above mixture with stirring and at ambient temperature. As soon as a homogeneous suspension is obtained, pouring in of 7.79 g of a zeolite of FAU structural type (CBV720, $SiO_2/Al_2O_3$=33.52, Zeolyst, LOI=6.63%) is commenced and the suspension obtained is kept stirring for 30 minutes at ambient temperature. In order to promote the formation of a zeolite of AFX structural type, 0.646 g of seeds (10% relative to the mass of CBV720 zeolite) of a zeolite of AFX structural type are added to the synthesis mixture and kept stirring for 5 minutes. The reaction mixture then undergoes a step of maturation for 24 hours at ambient temperature with stirring (200 rpm). The molar composition of the precursor gel is as follows: 1 $SiO_2$:0.0298 $Al_2O_3$:0.18 R:0.20 $Na_2O$:34 $H_2O$, i.e. an $SiO_2/Al_2O_3$ ratio of 33.55. The precursor gel is then transferred, after homogenization, into a 160 mL stainless steel reactor fitted with a stirring system with four inclined paddles. The reactor is closed and then heated for 5 hours under autogenous pressure with an increase in temperature of 5° C./min up to 180° C. and with stirring at 200 rpm to allow the crystallization of the zeolite of AFX structural type. The crystallized product obtained is filtered off, washed with deionized water and then dried overnight at 100° C. The loss on ignition of the dried solid is 14.82%. The solid is then introduced into a muffle furnace where a calcination step is performed: the calcination cycle comprises an increase in temperature of 1.5° C./min up to 200° C., a steady stage at 200° C. maintained for 2 hours, an increase of 1° C./min up to 550° C., followed by a steady stage at 550° C. maintained for 12 hours, then a return to ambient temperature.

The calcined solid product was analyzed by X-ray diffraction and identified as consisting of a zeolite of AFX structural type (ICDD file, PDF 04-011-1869) with a purity of greater than 99% by weight. The product has a molar $SiO_2/Al_2O_3$ ratio of 11.42 as determined by XRF.

The calcined AFX zeolite is then brought into contact with a 3 M $NH_4NO_3$ solution for 1 hour with stirring at 80° C. The ratio between the volume of $NH_4NO_3$ solution and the mass of solid is 10. The solid obtained is filtered off and washed and the exchange procedure is repeated twice more under the same conditions. The final solid is separated off, washed and dried for 12 hours at 100° C. XRD analysis shows that the product obtained is a pure zeolite of AFX structural type.

The AFX zeolite in ammoniacal form is treated under a stream of air at 550° C. for 8 hours with a temperature increase gradient of 1° C./min. The product obtained is an AFX zeolite in protonated form.

Cu Ion Exchange

The calcined AFX zeolite in protonated form is brought into contact with a $[Cu(NH_3)_4](NO_3)_2$ solution for 12 hours with stirring at ambient temperature. The final solid is separated off, washed and dried for 12 hours at a temperature of 100° C.

The exchanged Cu-AFX solid obtained after the contacting with the $[Cu(NH_3)_4](NO_3)_2$ solution is calcined under a stream of air at 550° C. for 8 hours.

The calcined solid product is analyzed by X-ray diffraction and identified as a zeolite of AFX structural type (ICDD file, PDF 04-011-1869). The diffraction pattern created by this solid is given in FIG. 2C.

The product has a molar SiO$_2$/Al$_2$O$_3$ ratio of 11.42 and a percentage by mass of Cu of 3%, as determined by XRF.

The catalyst obtained is denoted CuAFX720.

Example 5: Preparation of a Zeolite of AFX Structural Type According to the Invention with 3% Cu Preparation of the AFX Zeolite 28.35 g of an aqueous solution of 1,6-bis(methylpiperidinium)hexane dihydroxide (18.36% by weight) prepared according to example 1 are mixed with 41.22 g of deionized water with stirring and at ambient temperature. 1.26 g of sodium hydroxide (98% by weight, Aldrich) are dissolved in the above mixture with stirring and at ambient temperature. 5.74 g of Aerosil 380 silica (100% by weight, Degussa) are then poured in in small fractions with stirring. As soon as a homogeneous suspension is obtained, pouring in of 3.43 g of a zeolite of FAU structural type (CBV600 Zeolyst, SiO$_2$/Al$_2$O$_3$=5.48, LOI=12.65%) is commenced and the suspension obtained is kept stirring for 30 minutes at ambient temperature. The reaction mixture then undergoes a step of maturation for 2 hours at ambient temperature with stirring (350 rpm). The precursor gel obtained has the following molar composition: 1 SiO$_2$: 0.05 Al$_2$O$_3$:0.125 R:0.12 Na$_2$O: 27.55 H$_2$O, i.e. an SiO$_2$/Al$_2$O$_3$ ratio of 20. 0.79 g of seeds of zeolite of AFX structural type (8.7% relative to the mass of anhydrous CBV600 zeolite and of Aerosil 380 silica) are introduced into the precursor gel with stirring. The precursor gel containing the AFX zeolite seeds is then transferred into a 160 mL stainless steel reactor fitted with a stirring system with 4 inclined paddles. The reactor is closed and then heated for 7 hours under autogenous pressure with an increase in temperature of 5° C./min up to 190° C. and with stirring at 200 rpm to allow the crystallization of the zeolite of AFX structural type. The solid obtained is filtered off, washed with deionized water and then dried overnight at 100° C. The loss on ignition of the dried solid is 12.6%.

The solid is then introduced into a muffle furnace where a calcination step is performed: the calcination cycle comprises an increase in temperature of 1.5° C./min up to 200° C., a steady stage at 200° C. maintained for 2 hours, an increase of 1° C./min up to 580° C., followed by a steady stage at 580° C. maintained for 10 hours, then a return to ambient temperature.

The calcined solid product was analysed by X-ray diffraction and identified as consisting of a zeolite of AFX structural type (ICDD file, PDF 04-011-1869) with a purity of greater than 97% by weight. The product has a molar SiO$_2$/Al$_2$O$_3$ ratio of 11.2 as determined by XRF.

The calcined AFX zeolite is then brought into contact with a 3 M NH$_4$NO$_3$ solution for 1 hour with stirring at 80° C. The ratio between the volume of NH$_4$NO$_3$ solution and the mass of solid is 10. The solid obtained is filtered off and washed and the exchange procedure is repeated twice more under the same conditions. The final solid is separated off, washed and dried for 12 hours at 100° C. XRD analysis shows that the product obtained is a pure zeolite of AFX structural type.

The AFX zeolite in ammoniacal form is treated under a stream of air at 550° C. for 8 hours with a temperature increase gradient of 1° C./min. The product obtained is an AFX zeolite in protonated form.

Cu Ion Exchange

The calcined AFX zeolite in protonated form is brought into contact with a [Cu(NH$_3$)$_4$](NO$_3$)$_2$ solution for 12 hours with stirring at ambient temperature. The final solid is separated off, washed and dried for 12 hours at a temperature of 100° C.

The exchanged Cu-AFX solid obtained after the contacting with the [Cu(NH$_3$)$_4$](NO$_3$)$_2$ solution is calcined under a stream of air at 550° C. for 8 hours.

The calcined solid product is analyzed by X-ray diffraction and identified as a zeolite of AFX structural type (ICDD file, PDF 04-011-1869). The diffraction pattern created by this solid is given in FIG. 2D.

The product has a molar SiO$_2$/Al$_2$O$_3$ ratio of 11.2 and a percentage by mass of Cu of 3%, as determined by XRF.

The catalyst obtained is denoted CuAFX600.

Example 6

In this example, a Cu-exchanged SSZ-16 zeolite is synthesized in accordance with the prior art. In this example, the copper is introduced by ion exchange.

Preparation of the SSZ-16 Zeolite 17.32 g of sodium hydroxide are dissolved in 582.30 g of deionized water, with stirring (300 rpm) and at ambient temperature. 197.10 g of sodium silicate are added to this solution and the whole mixture is homogenized with stirring (300 rpm) at ambient temperature. 9.95 g of CBV100 NaY zeolite are then added with stirring (300 rpm), and this is continued until the zeolite has dissolved. 43.67 g of the structuring agent DABCO-C4 are dissolved in the solution obtained and this is then homogenized with stirring (450 rpm) for 30 minutes at ambient temperature.

The reaction mixture has the following molar composition: 100 SiO$_2$:1.67 Al$_2$O$_3$:50 Na$_2$O:10 DABCO-C4:4000 H$_2$O The reaction mixture obtained in the mixing step is maintained at ambient temperature with stirring for 24 hours.

The gel obtained is introduced into a reactor and heated to a temperature of 150° C. for 6 days with stirring (200 rpm). The crystals obtained are separated off and washed with deionized water until a pH of the washing water of less than 8 is obtained. The washed crystallized solid is dried for 12 hours at 100° C. The loss on ignition (L01) is 18% by weight.

An XRD analysis shows that the product obtained is a pure crude synthetic SSZ-16 zeolite of AFX structural type (ICDD file, PDF 04-011-1869).

The crude synthetic SSZ-16 zeolite is calcined under a stream of dry air at 550° C. for 12 hours. The calcined SSZ-16 zeolite is brought into contact with a 3 M NH$_4$NO$_3$ solution for 5 hours with stirring at ambient temperature. The ratio between the volume of NH$_4$NO$_3$ solution and the mass of solid is 10. The solid obtained is filtered off and washed and the exchange procedure is repeated once more under the same conditions. The final solid is separated off, washed, and dried for 12 hours at 100° C.

The SSZ-16 zeolite in ammoniacal form (NH$_4$—SSZ-16) is treated under a stream of dry air at 550° C. for 8 hours with a temperature increase gradient of 1° C./min. The product obtained is an SSZ-16 zeolite in protonated form (H—SSZ-16).

Cu Ion Exchange on H—SSZ-16

The H—SSZ-16 zeolite is brought into contact with a [Cu(NH$_3$)$_4$](NO$_3$)$_2$ solution for 12 hours with stirring at ambient temperature. The final solid is separated off, washed and dried, and calcined under a stream of dry air at 550° C. for 8 hours. An XRD analysis shows that the product obtained is a pure SSZ-16 zeolite of AFX structural type (ICDD file, PDF 04-011-1869).

Chemical analysis by X-ray fluorescence (XRF) gives a molar $SiO_2/Al_2O_3$ ratio of 13 and a percentage by mass of Cu of 3%.

The catalyst obtained is denoted CuSSZ16.

Example 7: $NO_x$ Conversion Under Standard SCR Conditions: Comparison of the Catalysts According to the Invention with the Prior Art A catalytic test of the reduction of nitrogen oxides ($NO_x$) by ammonia ($NH_3$) in the presence of oxygen ($O_2$) under standard SCR conditions is carried out at various operating temperatures for the catalysts according to example 2 (CuAFX, according to the invention), example 3 (CuAFX780, according to the invention), example 4 (CuAFX720, according to the invention), example 5 (CuAFX600, according to the invention) and the catalyst according to example 6 (CuSSZ16, comparative).

For testing each sample, 200 mg of catalyst in powder form are placed in a quartz reactor. 145 L/h of a feed representative of a mixture of exhaust gas from a diesel engine are fed into the reactor.

This feed has the following molar composition: 400 ppm NO, 400 ppm $NH_3$, 8.5% $O_2$, 9% $CO_2$, 10% $H_2O$, remainder $N_2$.

An FTIR analyzer is used to measure the concentration of the species NO, $NO_2$, $NH_3$, $N_2O$, CO, $CO_2$, $H_2O$, $O_2$ at the reactor outlet. The $NO_x$ conversions are calculated as follows:

Conversion=(NO$x$ inlet−NO$x$ outlet)/NO$x$ inlet

The results of NOx conversion under the standard SCR conditions are presented in FIG. 3, the curves CuAFX, CuAFX780, CuAFX720, CuAFX600 and CuSSZ16 respectively corresponding to the tests performed with the catalysts synthesized in accordance with example 2 (CuAFX, catalyst according to the invention), example 3 (CuAFX780, catalyst according to the invention), example 4 (CuAFX720, catalyst according to the invention), example 5 (CuAFX600, catalyst according to the invention), and example 6 (CuSSZ16, catalyst not in accordance with the invention). It appears that the catalysts according to the invention can be used to convert NOx.

The catalysts CuAFX, CuAFX780, CuAFX720 and CuAFX600 synthesized in accordance with the invention exhibit a performance which is superior to the catalyst CuSSZ16 synthesized in accordance with the prior art in terms of NOx conversion over the entire temperature range tested. A maximum conversion rate of 100% is achieved between 259° C. and 430° C. for catalyst CuAFX780 in accordance with the invention, whereas catalyst CuSSZ16 synthesized in accordance with the prior art achieves only an 89% conversion rate between 340 and 400° C.

The light-off temperatures for the catalysts are given below for standard SCR conditions:

TABLE 1

|  | T50 | T80 | T90 | T100 |
|---|---|---|---|---|
| CuAFX | 180° C. | 212° C. | 228° C. | 310° C. |
| CuAFX780 | 159° C. | 190° C. | 204° C. | 259° C. |
| CuAFX720 | 173° C. | 202° C. | 217° C. | 272° C. |
| CuAFX600 | 172° C. | 203° C. | 222° C. | 283° C. |
| CuSSZ16 | 190° C. | 257° C. | 350° C. | — |

T50 corresponds to the temperature at which 50% of the NOx in the gas mixture are converted by the catalyst. T80 corresponds to the temperature at which 80% of the NOx in the gas mixture are converted by the catalyst. T90 corresponds to the temperature at which 90% of the NOx in the gas mixture are converted by the catalyst. T100 corresponds to the temperature at which 100% of the NOx in the gas mixture are converted by the catalyst.

The catalysts CuAFX, CuAFX780, CuAFX720 and CuAFX600 synthesized in accordance with the invention exhibit a performance which is far superior to the catalyst CuSSZ16 synthesized in accordance with the prior art in terms of light-off temperatures and NOx conversion over the entire temperature range tested under standard SCR conditions. Specifically, at the same conversion rate (50% or 80%), the light-off temperatures obtained with the catalyst according to the invention CuAFX are lower than those obtained with the catalyst CuSSZ16.

Example 8: NOx Conversion in Fast SCR: Comparison of the Catalysts According to the Invention and Comparative Catalyst A catalytic test of the reduction of nitrogen oxides (NOx) by ammonia ($NH_3$) in the presence of oxygen ($O_2$) under fast SCR conditions is carried out at various operating temperatures for the catalysts synthesized in accordance with the invention (examples 2, 3, 4 and 5) and the sample CuSSZ16 synthesized in accordance with the prior art (example 6).

200 mg of catalyst in powder form are placed in a quartz reactor. 218 l/h of a feed representative of a mixture of exhaust gas from a diesel engine are fed into the reactor. This feed has the following molar composition: 200 ppm NO, 200 ppm $NO_2$, 400 ppm $NH_3$, 8.5% $O_2$, 9% $CO_2$, 10% $H_2O$, remainder $N_2$ for fast SCR conditions.

An FTIR analyzer is used to measure the concentration of the species NO, $NO_2$, $NH_3$, $N_2O$, CO, $CO_2$, $H_2O$, $O_2$ at the reactor outlet. The NOx conversions are calculated as follows:

Conversion=(NO$x$ inlet−NO$x$ outlet)/NO$x$ inlet

The light-off temperatures for the catalysts are given below for fast SCR conditions:

TABLE 2

|  | T50 | T80 | T90 | T100 |
|---|---|---|---|---|
| CuAFX | 178° C. | 210° C. | 235° C. | 290° C. |
| CuAFX780 | 162° C. | 192° C. | 215° C. | 270° C. |
| CuAFX720 | 161° C. | 190° C. | 214° C. | 267° C. |
| CuAFX600 | 166° C. | 200° C. | 220° C. | 273° C. |
| CuSSZ16 | 188° C. | 233° C. | 269° C. | 402° C. |

T50 corresponds to the temperature at which 50% of the NOx in the gas mixture are converted by the catalyst. T80 corresponds to the temperature at which 80% of the NOx in the gas mixture are converted by the catalyst. T90 corresponds to the temperature at which 90% of the NOx in the gas mixture are converted by the catalyst. T100 corresponds to the temperature at which 100% of the NOx in the gas mixture are converted by the catalyst.

The catalysts CuAFX, CuAFX780, CuAFX720 and CuAFX600 synthesized in accordance with the invention exhibit a performance which is superior to the catalyst CuSSZ16 synthesized in accordance with the prior art in terms of light-off temperatures and NOx conversion over the entire temperature range tested under fast SCR conditions.

Specifically, at the same conversion rate (50%, 80%, 90% or 100%), the light-off temperatures obtained with the catalyst according to the invention CuAFX are lower than those obtained with the catalyst Cu—SSZ-16.

In addition, the nitrous oxide ($N_2O$) emissions, in the case of the catalyst CuAFX according to the invention, remain low over the entire temperature range tested (<20 ppm between 150 and 550° C.).

The invention claimed is:

1. A process for preparing a catalyst based on a zeolite of AFX structural type and on at least one transition metal, comprising at least the following steps:
   i) the mixing, in an aqueous medium, of at least one source of at least one silicon oxide $SiO_2$, of at least one source of at least one aluminium oxide $Al_2O_3$, of an organic nitrogen-comprising compound R, also referred to as specific structuring agent, 1,6-bis(methylpiperidinium)hexane dihydroxide, of at least one alkali metal and/or one alkaline-earth metal M with a valency n, n being an integer greater than or equal to 1, the reaction mixture having the following molar composition:
   $SiO_2/Al_2O_3$ between 2 and 100,
   $H_2O/SiO_2$ between 5 and 60,
   $R/SiO_2$ between 0.05 and 0.50,
   $M_{2/n}O/SiO_2$ between 0.05 and 0.40,
   wherein M is one or more alkali and/or alkaline-earth metal(s) chosen from lithium, sodium, potassium, calcium, magnesium and a mixture of at least two of these metals, step i) being performed for a time enabling a homogeneous mixture known as a precursor gel to be obtained;
   ii) the hydrothermal treatment of the precursor gel obtained at the end of step i) under autogenous pressure at a temperature of between 120° C. and 250° C., for a time of between 2 and 12 hours, until the zeolite of AFX structural type is formed,
   iii) at least one ion exchange comprising bringing the solid obtained at the end of the previous step into contact with a solution comprising at least one species capable of releasing a transition metal in solution in reactive form, with stirring at ambient temperature for a time of between 1 hour and 2 days;
   iv) a heat treatment comprising drying of the solid obtained at the end of the previous step at a temperature of between 20 and 150° C. for a time of between 2 and 24 hours, followed by at least one calcination under—optionally dry—air at a temperature of between 450 and 700° C., for a time of between 2 and 20 hours.

2. The process for preparing a catalyst as claimed in claim 1, wherein at least one source of at least one silicon oxide $SiO_2$ and/or at least one source of at least one aluminium oxide $Al_2O_3$ is at least one zeolite of FAU structural type having a molar $SiO_2/Al_2O_3$ ratio of between 2.00 and 100.

3. The process as claimed in claim 1, wherein steps iii) and iv) are reversed and/or optionally repeated.

4. The process for preparing a catalyst as claimed in claim 1, wherein seed crystals of a zeolite of AFX structural type are added to the reaction mixture of step i), the seed crystals not being taken into account in the total mass of the sources of the tetravalent and trivalent elements.

5. The process as claimed in claim 4, wherein the seed crystals of a zeolite of AFX structural type are added to the reaction mixture of step i) in an amount of between 0.01% and 10% of the total mass of the sources of the tetravalent (Si) and trivalent (Al) elements in their oxide form ($SiO_2$ and $Al_2O_3$) which are used in the reaction mixture, the seed crystals not being taken into account in the total mass of the sources of the tetravalent and trivalent elements.

6. The process for preparing a catalyst as claimed in claim 1, wherein step iii) of ion exchange is carried out by bringing the solid into contact with a solution comprising a single species capable of releasing a transition metal or by successively bringing the solid into contact with different solutions each comprising at least one species capable of releasing a transition metal.

7. The process as claimed in claim 1, wherein the at least one transition metal released in the exchange solution of step iii) is selected from the group made up of the following elements: Ti, V, Mn, Mo, Fe, Co, Cu, Cr, Zn, Nb, Ce, Zr, Rh, Pd, Pt, Au, W, Ag.

8. The process as claimed in claim 1, wherein the content of transition metal(s) introduced by the ion exchange step iii) is between 0.5% and 6% by mass relative to the total mass of the anhydrous final catalyst.

9. The process as claimed in claim 1, wherein the reaction mixture has the following molar composition:
$SiO_2/Al_2O_3$ between 12 and 40
$H_2O/SiO_2$ between 10 and 40
$R/SiO_2$ between 0.10 and 0.40
$M_{2/n}O/SiO_2$ between 0.15 and 0.30.

10. The process as claimed in claim 1, wherein M is sodium and wherein the at least one ion exchange comprises bringing the solid obtained at the end of step ii) into contact with a solution comprising at least one species capable of releasing copper in solution in reactive form, with stirring at ambient temperature for a time of between 1 hour and 2 days.

11. The process as claimed in claim 1, wherein the hydrothermal treatment of the precursor gel obtained at the end of step i) under autogenous pressure is carried out at a temperature of between 150° C. and 230° C. for a time of between 2 and 10 hours until the zeolite of AFX structural type is formed.

12. The process as claimed in claim 1, wherein the heat treatment comprises drying of the solid obtained at the end of step iii) at a temperature of between 60 and 100° C. for a time of between 2 and 24 hours, followed by at least one calcination under—optionally dry—air at a temperature of between 500 and 600° C. for a time of between 6 and 16 hours, the flow rate of optionally dry air being between 0.5 and 1.5 L/h/g of solid to be treated.

13. The process for preparing a catalyst as claimed in claim 1, wherein step iii) of ion exchange is carried out by bringing the solid into contact with a solution comprising a single species capable of releasing a transition metal or by successively bringing the solid into contact with different solutions each comprising a single species capable of releasing a transition metal, the transition metals of the different solutions being different from each other.

14. The process as claimed in claim 1, wherein the at least one transition metal released in the exchange solution of step iii) is selected from the group made up of the following elements: Fe, Cu, Nb, Ce or Mn.

15. The process as claimed in claim 1, wherein the content of transition metal(s) introduced by the ion exchange step iii) is between 0.5% and 5% by mass relative to the total mass of the anhydrous final catalyst.

16. A process for preparing a catalyst based on a zeolite of AFX structural type and on at least one transition metal, comprising at least the following steps:
   i) the mixing, in an aqueous medium, of at least one source of at least one silicon oxide $SiO_2$, of at least one source of at least one aluminium oxide $Al_2O_3$, of an organic nitrogen-comprising compound R, also referred to as specific structuring agent, 1,6-bis(methylpiperidinium) hexane dihydroxide, of at least one alkali metal and/or one alkaline-earth metal M with a valency n, n being an integer greater than or equal to 1, the reaction mixture having the following molar composition:

$SiO_2/Al_2O_3$ between 2 and 100,
$H_2O/SiO_2$ between 5 and 60,
$R/SiO_2$ between 0.05 and 0.50,
$M_{2/n}O/SiO_2$ between 0.05 and 0.40 wherein M is one or more alkali and/or alkaline-earth metal(s) chosen from lithium, sodium, potassium, calcium, magnesium and a mixture of at least two of these metals, step i) being performed for a time enabling a homogeneous mixture known as a precursor gel to be obtained, wherein step i) comprises a step of maturation of the reaction mixture at a temperature of between 20 and 80° C., with or without stirring, for a time of between 30 minutes and 24 hours;

ii) the hydrothermal treatment of the precursor gel obtained at the end of step i) under autogenous pressure at a temperature of between 120° C. and 250° C., for a time of between 2 and 12 hours until the zeolite of AFX structural type is formed, iii) at least one ion exchange comprising bringing the solid obtained at the end of the previous step into contact with a solution comprising at least one species capable of releasing a transition metal in solution in reactive form, with stirring at ambient temperature for a time of between 1 hour and 2 days;

iv) a heat treatment comprising drying of the solid obtained at the end of the previous step at a temperature of between 20 and 150° C. for a time of between 2 and 24 hours, followed by at least one calcination under-optionally dry-air at a temperature of between 450 and 700° C. for a time of between 2 and 20 hours.

\* \* \* \* \*